(12) United States Patent
Brietbach

(10) Patent No.: US 7,884,304 B2
(45) Date of Patent: Feb. 8, 2011

(54) APPARATUS AND METHOD FOR STORING WELDING CONSUMABLES

(75) Inventor: John C. Brietbach, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 776 days.

(21) Appl. No.: 11/485,065

(22) Filed: Jul. 12, 2006

(65) Prior Publication Data

US 2008/0011729 A1   Jan. 17, 2008

(51) Int. Cl.
  *B23K 9/10* (2006.01)
(52) U.S. Cl. ............. 219/133; 219/136; 219/130.1; 219/137.9; 206/373
(58) Field of Classification Search ............. 219/133, 219/136, 130.1, 137.9; 206/373
  See application file for complete search history.

(56) References Cited

U.S. PATENT DOCUMENTS

| | | | |
|---|---|---|---|
| 4,846,346 A | 7/1989 | Kime | |
| 5,599,470 A | 2/1997 | Peotter et al. | |
| 6,137,080 A | 10/2000 | Borchardt et al. | |
| 6,396,019 B1 * | 5/2002 | Williams | 219/136 |
| 6,533,138 B2 * | 3/2003 | Chwen-Ru | 220/522 |
| 6,596,972 B1 * | 7/2003 | Di Novo et al. | 219/137.9 |
| 6,648,166 B2 * | 11/2003 | Levy | 220/520 |
| 6,707,000 B2 | 3/2004 | Schneider et al. | |
| 6,750,429 B2 | 6/2004 | Bogner et al. | |
| 6,930,282 B1 | 8/2005 | Di Novo et al. | |
| 2002/0117414 A1 * | 8/2002 | Kipper et al. | 206/373 |
| 2003/0152722 A1 * | 8/2003 | Fearn et al. | 428/34.1 |
| 2004/0182845 A1 * | 9/2004 | Crisler et al. | 219/130.1 |
| 2005/0000946 A1 * | 1/2005 | Albrecht et al. | 219/74 |

FOREIGN PATENT DOCUMENTS

EP   1 247 609 A2   10/2002

OTHER PUBLICATIONS

Howard Electronics website, howardelectronics.com, updated Apr. 4, 2005.*

* cited by examiner

*Primary Examiner*—Jessica L Ward
*Assistant Examiner*—Erin B Saad
(74) *Attorney, Agent, or Firm*—Fletcher Yoder

(57) ABSTRACT

Exemplary embodiments of the present technique relate to a welding storage structure. In one embodiment, a welding system includes a welding chassis and a storage structure that rotates outwardly from the welding chassis. In another embodiment, a welding system includes a welding storage unit having a storage base with a plurality of storage compartments, a cover removably disposed over the plurality of the storage compartments, and a rotatable chassis mount configured to couple the welding storage unit rotatably to a welding chassis.

13 Claims, 3 Drawing Sheets

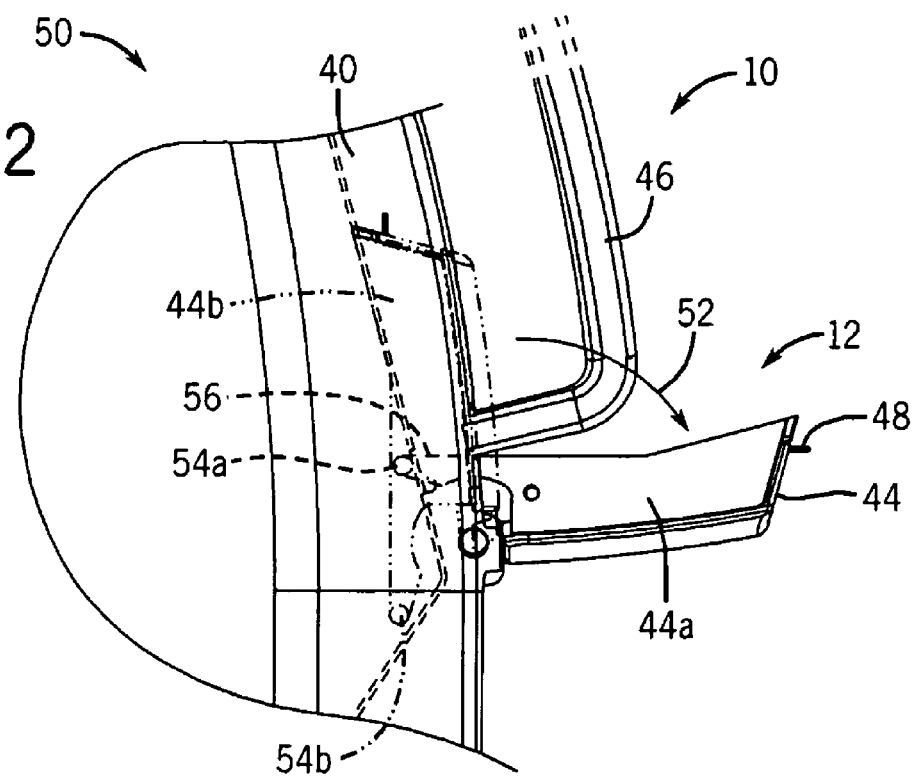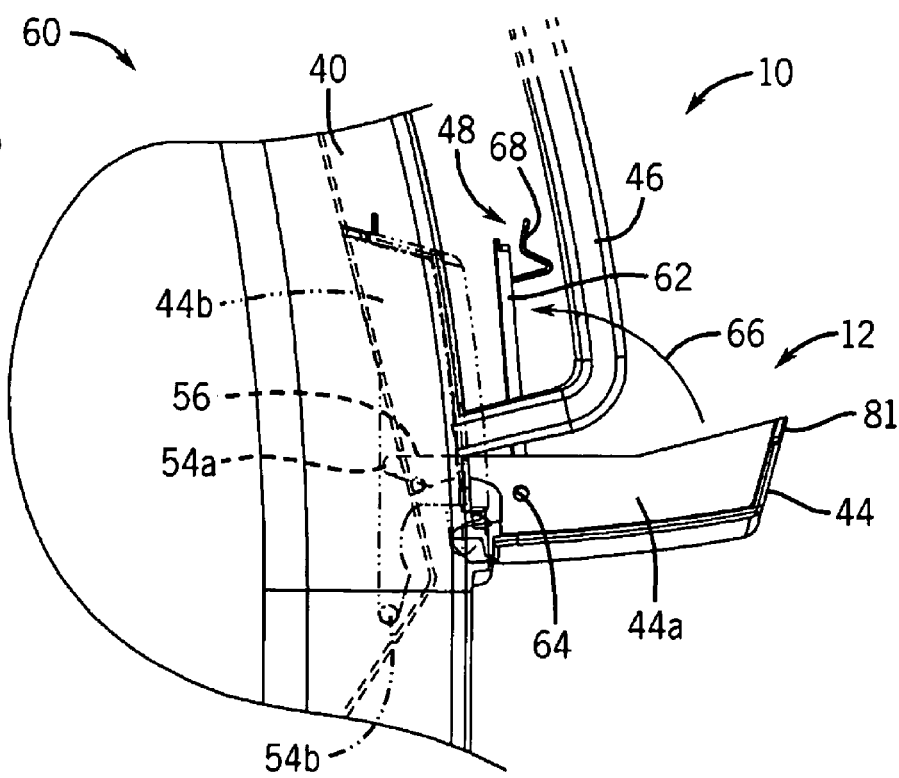

APPARATUS AND METHOD FOR STORING WELDING CONSUMABLES

BACKGROUND

Welding systems generally include a variety of items that are either consumed or worn during welding operations. In addition, certain welding operations involve an exchange of one or more items with alternatives having different sizes, shapes, and other features. The items may include welding wire electrodes and welding gun parts, such as seals, contact tips, and nozzles, among others. For example, welding operations may consume one or more electrodes and wear components due to thermal, electrical, and mechanical fatigue, stresses, friction, and so forth. By further example, a particular welding operation may involve exchanging one contact tip with another having a larger or smaller diameter passage to receive a particular electrode. Unfortunately, existing welding systems do not provide easily accessible and secure storage areas dedicated to these items. As a result, the items are often misplaced or lost, causing substantial delays and increased costs.

BRIEF DESCRIPTION

Exemplary embodiments of the present technique relate to a welding storage structure. In one embodiment, a welding system includes a welding chassis and a storage structure that rotates outwardly from the welding chassis. In another embodiment, a welding system includes a welding storage unit having a storage base with a plurality of storage compartments, a cover removably disposed over the plurality of the storage compartments, and a rotatable chassis mount configured to couple the welding storage unit rotatably to a welding chassis.

DRAWINGS

These and other features, aspects, and advantages of the present invention will become better understood when the following detailed description is read with reference to the accompanying drawings in which like characters represent like parts throughout the drawings, wherein:

FIG. 2 is a partial side view of the welding system as illustrated in FIG. 1, further illustrating an embodiment of the front storage apparatus disposed in an unfolded or rotatably extracted position;

FIG. 3 is a partial side view of the welding system as illustrated in FIG. 1, further illustrating an embodiment of the front storage apparatus disposed in an unfolded or rotatably extracted position with a cover disposed in an open position;

DETAILED DESCRIPTION

Figure 1:
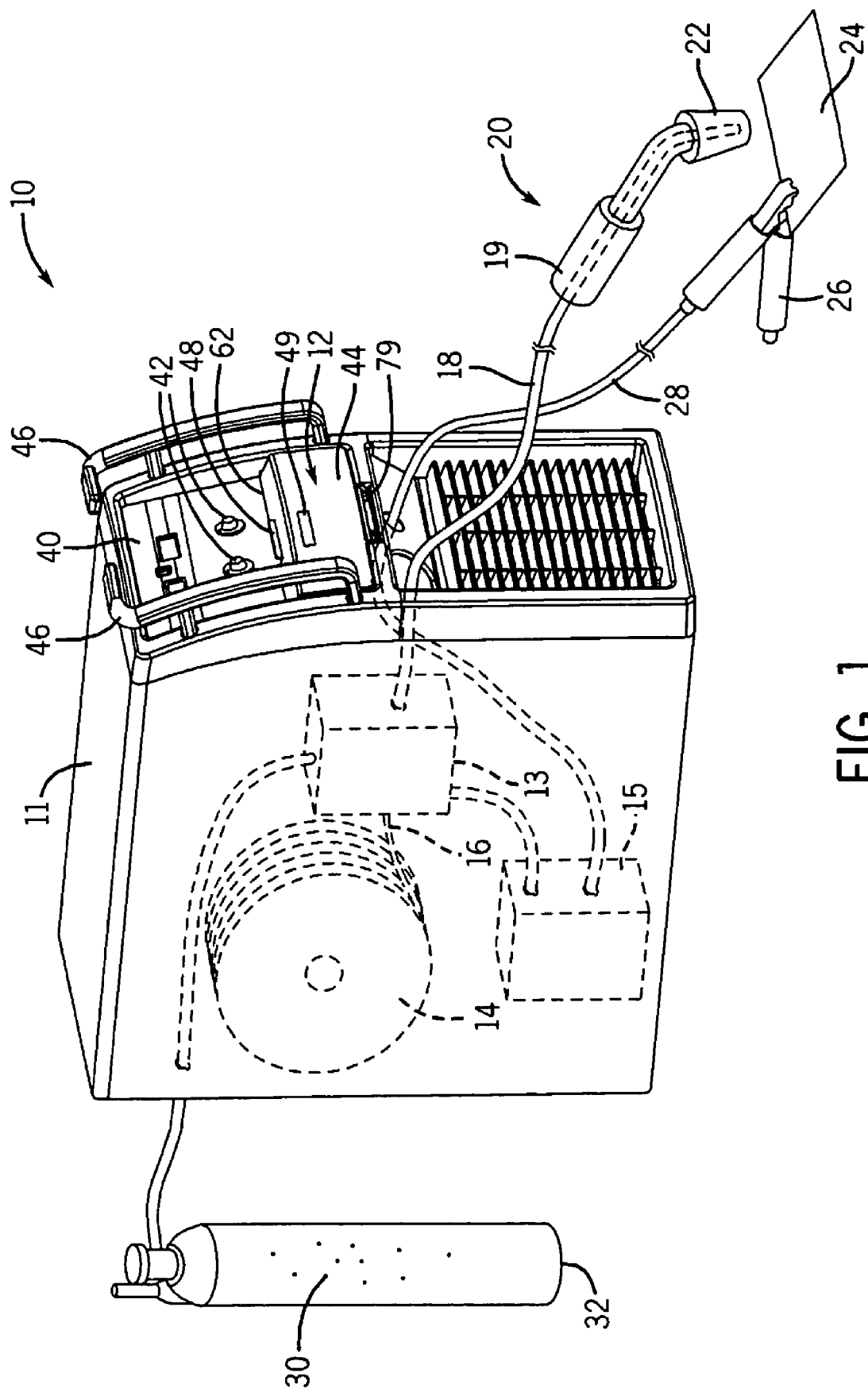
FIG. 1 is a perspective view of a welding system having a front storage apparatus disposed in a folded or rotatably retracted position in accordance with an exemplary embodiment of the present technique.

Referring generally to FIG. 1, this figure depicts an exemplary portable arc welding system 10 having a welding chassis 11 with a front storage apparatus 12. As discussed in further detail below, the front storage apparatus 12 may be self-contained, removable, and rotatable relative to the welding chassis 11. For example, the front storage apparatus 12 may be rotated or generally pivoted inward and outward from the chassis between folded and unfolded positions relative to the chassis 11. In the illustrated embodiment, the folded position is generally upright or vertical along the front of the chassis 11, while the unfolded position (see FIGS. 2 and 3) is generally protruding outward or horizontal relative to the front of the chassis 11. The front storage apparatus 12 also may include a substantially or entirely self-enclosed storage volume independent from the chassis 11. Thus, the front storage apparatus 12 may be released and removed from the chassis 11, while still containing various items within the self-enclosed storage volume. In the illustrated embodiment, the front storage apparatus 12 is generally dedicated to the storage of consumables, wear items, replacement items, and other items that may be generally exchanged for a particular welding operation. In the following discussion, the term consumables may include electrodes, welding gun parts, fittings, seals, sleeves, collars, contact tips, nozzles, and other parts that may be replaced prior to or in the course of a welding operation.

In addition, the front storage apparatus 12 may include one or more informational labels, which may include text, figures, symbols, codes, and other information relevant to replacement parts, welding parameters, or generally operating or servicing the welding system 10. As discussed below, the informational labels also may be thermally, chemically, or materially fused into the interior and/or exterior of the front storage apparatus 12, e.g., without use of glue, tape, or adhesives.

The disclosed embodiments of the front storage apparatus 12 may be manufactured with a variety of welding power units, wire feed mechanisms, or general welding systems, including arc welding systems, gas welding systems, and so forth. In the illustrated embodiment of FIG. 1, the welding system 10 includes a wire feeder 13 having a wire spool 14 disposed within the welding chassis 11. The welding system 10 also includes a welding current source or power unit 15, which may include one or more control units or circuit boards and associated automatic and manual controls. The wire feeder 13 receives an electrode wire 16 from the wire spool 14 and generally drives or forces the electrode wire 16 into and through a welding cable 18 to a welding gun 20. In the illustrated embodiment, the electrode wire 16 has a generally tubular shape and a metallic composition. A flux also may be disposed within the tubular metal electrode wire 16. Eventually, the electrode wire 16 passes through and protrudes from a welding contact tip and nozzle assembly 22, where the peripheral end or tip of the electrode wire 16 melts with a work piece 24 as an arc forms during a welding operation. In certain embodiments, the wire feeder 13 may be separate from the welding chassis 11. In other embodiments, the wire feeder 13 may be excluded and the welding system 10 may utilize stick electrodes.

A welding circuit is set up as follows. The welding cable 18 has conductors for transmitting current or power from the power unit 15 of the welding system 10 to the welding gun 20. The welding gun 20, in turn, transmits the current or power to the contact tip in the contact tip and nozzle assembly 22. The work piece 24 is electrically coupled to one terminal of the power unit 15 by a ground clamp 26 and a ground cable 28. Thus, an electrical circuit between the work piece 24 and the power unit 15 is completed when the electrode wire 16 of the welding gun 20 is placed in proximity to, or in contact with, the work piece 24, and the welding gun 20 is engaged to produce an arc between the wire 16 and the work piece 24. The heat produced by the electric current flowing into the work piece 24 through the arc causes the work piece 24 to melt in the vicinity of the arc, also melting the electrode wire 16. Thus, the arc generally melts a portion of the work piece 24 and a tip portion of the welding wire 16, thereby creating a weld with materials from both the work piece 24 and the welding wire 16.

In the illustrated embodiment, gas 30 stored in a gas cylinder 32 is used to shield the molten weld puddle from impurities. For example, the gas cylinder 32 feeds gas 30 to the wire feeder 13. The gas 30 is fed, along with the electrode wire 16, through the welding cable 18 to the neck of the welding gun 20. The inert shield gas 30 prevents impurities entering the weld puddle and degrading the integrity of the weld. However, other shielding techniques, such as flux, may be used in certain embodiments of the welding system 10.

During operation, the welding contact tip and nozzle assembly 22 may be subjected to high temperatures, thermal fatigue, and friction wear by the electrode wire 16 passing through the contact tip. The welding gun 20 also may include additional elements, such as valves, rings, seals, shielding gas lenses screws, nuts and so forth. These and other items associated with the welding gun 20 may be consumable items, or wear items, or exchangeable items depending on a particular welding operation. As noted above, the front storage apparatus 12 may store one or more of these various items.

The welding system 10 of FIG. 1 further includes a front bezel 40 having control knobs and/or control gauges 42, which may be coupled to the power unit 15, the wire feeder 13, and one or more controllers, circuit boards, and other internal components. The control knobs and/or gauges 42 may generally control and/or measure parameters, such as shielding gas flow and pressure, wire feed speed, voltage, and current.

The front bezel 40 further includes the front storage apparatus 12 disposed between two front handles 46. In the illustrated embodiment, the front storage apparatus 12 is disposed at the front of the welding chassis 11 and at a height above the ground, permitting the welder convenient access to the front storage apparatus 12. The front storage apparatus 12 includes a storage tray or base 44 coupled to the chassis 11, and a cover 62 (see FIGS. 5-6) coupled to the storage base 44. In this manner, the front storage apparatus 12 has a storage volume or space that is a self-contained by the storage base 44 and the cover 62. In other words, the self-contained inner space or storage volume of the front storage apparatus 12 is independent and distinct from the space of the welding chassis 11 and various components (e.g., power unit 15 and wire feeder 13) disposed in the welding chassis 11. As mentioned above, the illustrated front storage apparatus 12 may be hingedly, rotatably, or generally pivotably coupled to the chassis 11, such that the front storage apparatus 12 can rotate between folded and unfolded positions relative to the chassis 11. In addition, the illustrated front storage apparatus 12 may be removable from the chassis 11, thereby allowing access to the storage space away from the chassis 11. The illustrated front storage apparatus 12 also includes a handle 48, which may facilitate rotating the apparatus 12 relative to the chassis 11 and also carrying the apparatus 12 when removed from the chassis 11.

As mentioned above, the front storage apparatus 12 also may include one or more labels, such as an external label 49. The label 49 may include text, graphics, symbols, and general information pertaining to welding parameters, charts, replacement parts, and contents of the front storage apparatus 12. In certain embodiments, the label 49 may be integrally fused into the front storage apparatus 12 without any glue or adhesives. For example, the label 49 may be a plastic sheet that is placed in a mold cavity being filled with a plastic material to form the shape of a portion of the storage apparatus 12, e.g., the storage base 44. Thus, the heat of plastic injected into the mold cavity causes the plastic sheet of the label 49 to generally melt or thermally fuse with the plastic in the mold.

The front storage apparatus 12 is adapted to store a variety of welding items, such as replacement contact tips and/or nozzles 22 of the welding gun 20, the neck 19 of the welding gun 20, gas valves, clamps 26, o-rings, seals, fasteners, and various sizes and shapes of these parts. The front storage apparatus 12 may also contain tools used during welding tasks, parts replacement or exchange tasks, servicing tasks, and so forth. These tools may include screwdrivers, drills, markers, wire cutters, files, pliers, socket sets, and wrenches.

Turning now to FIG. 2, this figure is a partial side view 50 of the arc welding system 10 as illustrated in FIG. 1, further illustrating rotational positions of the front storage apparatus 12 relative to the chassis 11. Specifically, FIG. 2 illustrates two rotational positions 44a and 44b of the front storage apparatus 12 relative to the front bezel 40 of the arc welding system 10. In the illustrated embodiment, the front storage apparatus 12 can be moved about a rotational axis between at least two locked or secure rotational positions, including an unfolded position or rotatably extracted position 44a (solid lines) and a folded position or rotatably retracted position 44b (dashed lines). The front storage apparatus 12 is rotatable between these two positions 44a and 44b as indicated by arrow 52. In addition, as illustrated in FIG. 2, the folded or rotatably retracted position 44b is generally recessed into a cavity within the front bezel 40 in a generally upright or vertical orientation, whereas the unfolded position 44a is extended outward from the front bezel 40 in a generally protruding or horizontal orientation.

The front storage apparatus 12 may be unfolded or extracted away from the front bezel 40 by initially pulling on the handle 48, thereby unlatching or generally releasing the front storage apparatus 12 from the front bezel 40 in the locked folded position 44b. In other words, the front storage apparatus 12 and/or the handle 48 may include a latch, snap-fit mechanism, hook, or other tool-free fastener that engages with a mating fastener on the front bezel 40. Subsequently, the front storage apparatus 12 may rotate downward toward the unfolded position 44a via gravity and one or more resistive mechanisms, such as a coil spring, a hydraulic mechanism, or another force in the opposite direction. Thus, the resistive mechanism may enable a smooth or generally slow movement of the front storage apparatus 12 from the folded position 44b to the unfolded position 44a. In one or both of the positions 44a or 44b, the front storage apparatus 12 may be locked in place to prevent inadvertent upward or downward movements relative to the chassis 11. In certain embodiments, the front storage apparatus 12 may include a keyed lock, a combination lock, a magnetic lock, or another security mechanism to secure the contents of the front storage apparatus 12.

The front storage apparatus 12 as illustrated in FIG. 2 includes a pair of prongs 54 disposed on an outer edge of a pair of opposite supporting arms 56 of the storage base 44. The prongs 54 mate with prong receptacles, grooves, or pathways in the chassis 11 to enable rotation of the front storage apparatus 12 between the positions 44a and 44b as indicated by arrow 52. In other words, the mating between the prongs 54 and the prong receptacles represent a rotational axis, or hinge axis, or general pivot axis between the front storage apparatus 12 and the chassis 11. In certain embodiments, the prongs 54 may move along a linear path, or a curved path, or both as the front storage apparatus 12 rotates betweens the positions 44a and 44b. When the storage base 44 is disposed in the unfolded position 44a, the prong 54 may be disposed at a position labeled 54a. When the storage base 44 is in the folded position 44b, the prong may be disposed in a position labeled 54b. As depicted in FIG. 2, movement of the front storage apparatus 12 as indicated by arrow 52 or vice versa may corresponds to lateral, vertical, and curved motion of the prong 54 between the positions 54a and 54b. In certain embodiments, a plastic bezel 51 may provide a stop for the prongs 54 when those move between the positions 54a and 54b.

As further illustrated by FIG. 2, when in the folded position 44b, the front storage apparatus 12 may be almost completely flush with the front bezel 40. When in the unfolded position 44a, the front storage apparatus 12 extends almost completely beyond the front bezel 40 of the arc welding system 10 so that the top of the storage base 44 may be completely exposed and easily accessible.

FIG. 3 is a partial side view 60 of the arc welding system 10 as illustrated in FIGS. 1 and 2, further illustrating the rotational positions 44a and 44b of the front storage apparatus 12 relative to the chassis 11 and an open position of the cover 62 relative to the storage base 44. Specifically, FIG. 3 further illustrates the cover 62 rotatably coupled to the storage base 44 via hinge 64. The cover 62 may be opened or closed as it moves along an arc labeled by arrow 66. The cover 62 includes a latch 68, used to secure the cover 62 to the storage base 44 once the cover 62 is in a closed position. Once opened, the cover 62 maintains an upright and vertical position such that it does not close back down on the storage base 44. Further, once the cover 62 is opened, inner compartments of the storage base 44 may become fully exposed so as to provide the welder comfortable access to the consumable welding materials disposed in the inner compartments of the storage base 44.

Figure 4:
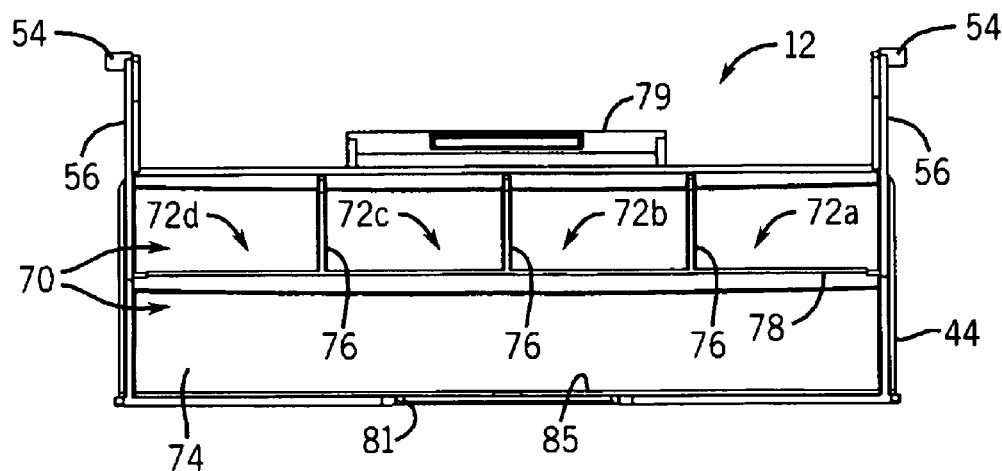
FIG. 4 is a top view of an embodiment of the front storage apparatus as illustrated in FIG. 1 without the cover.

FIG. 4 is a top view of an inner storage arrangement or compartmental configuration 70 of the storage base 44 in accordance with an exemplary embodiment of the present technique. The compartmental configuration 70 of the storage base 44 includes compartments 72a-72d and 74, which may include different shapes and sizes according to the type of consumable materials stored in the storage base 44. Accordingly, compartment dividers 76 and 78 may be configured to be modular such that their placement within the storage base 44 may correspondingly adapt the storage base 44 spatially. In this manner, inner space of the storage base 44 may be optimized to the particular welding consumables, wear items, replacement parts, and so forth. Further, each of the compartments 72a-72d and 74 securely holds the consumable welding materials and parts in designated places within the storage base 44. This may reduce the likelihood of undesired mixing of the contents as the welding system 10 may be shifted, for example, during transit between welding job sites.

In the illustrated embodiment, the supporting arms 56 may flex so as to induce lateral motion of the prongs 54. Such flexibility may enable the prongs 54 to detach from or attach to the chassis 11. This may enable the welder to carry the storage base 44 away from the chassis 11 to a more convenient location, such as a work bench, to facilitate repair, servicing, replacement of parts, and other assembly or disassembly of the welding gun 20 with the items in the storage base 44. Accordingly, the illustrated front storage apparatus 12 may include a carrying handle 79 disposed on a rear side of the storage base 44 between the supporting arms 56.

Figure 5:
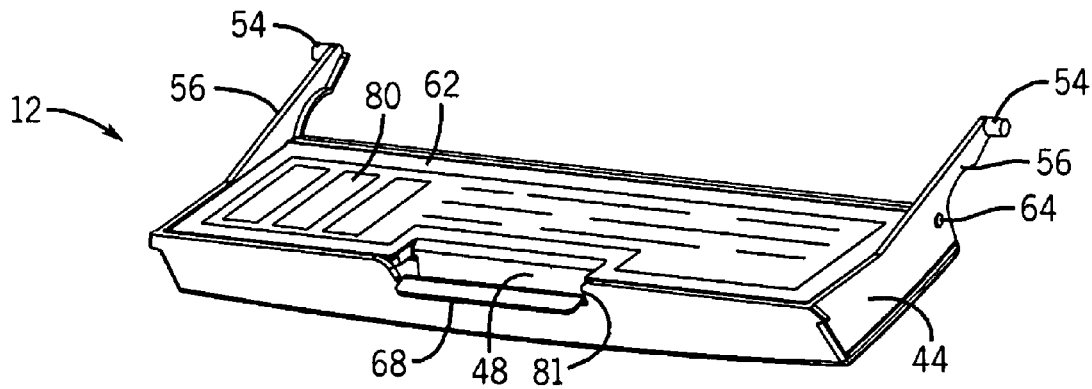
FIG. 5 is a perspective view of an embodiment of the front storage apparatus with the cover disposed in a closed position.
Figure 6:
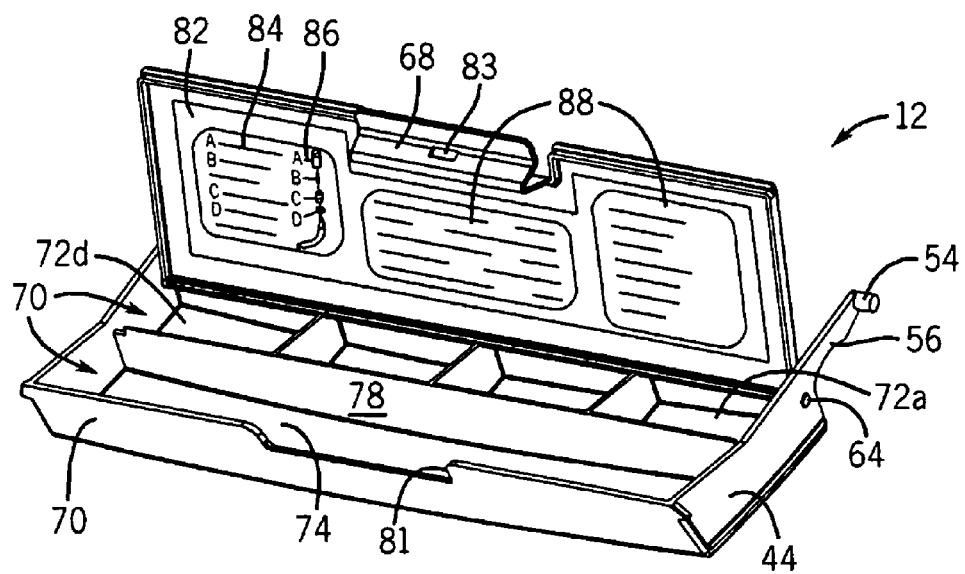
FIG. 6 is a perspective view of an embodiment of the front storage apparatus with the cover disposed in the open position.

FIG. 5 is a perspective view of front storage apparatus 12 having the cover 62 disposed in a closed position over the storage base 44 in accordance with an exemplary embodiment of the present technique. As discussed above with reference to FIG. 3, the cover 62 pivots about the hinge 64 as it opens or closes relative to the storage base 44. Further, the cover 62 includes the handle 48 used for opening the cover 62 relative to the storage base 44 as illustrated in FIGS. 5-6 and, also for rotating the front storage apparatus 12 between the folded and unfolded positions 44b and 44a relative to the chassis 11 as illustrated in FIGS. 2 and 3. When in a closed position, the cover 62 securely seals the storage base 44 such that materials disposed within the storage base 44 are not displaced and/or thrown out from the storage base 44. Again, the cover 62 may be latched or generally secured to the storage base 44 in the closed position, for example, by a snap-fit mechanism, a hook and slot, and compression fit, and so forth.

The cover 62 further includes one or more cover labels 80 disposed on the outer surface of the cover 62. The cover label 80 may include a variety of information, such as a company logo, address, contact information, welding parameters or settings, illustrations, and other useful information. For example, the cover label 80 may include a list of electrode wires, wire feed settings, gas flow settings, power output settings, and other parameters for a particular application. Accordingly, prior to a welding operation, a welder can utilize the label 80 to prepare appropriate welding materials, as well as configure the welding system 10 according to various specifications dictated by the nature of the welding operation.

The storage base 44 and the cover 62 may be generally formed via injection of a molding material, e.g., plastic, into a suitable molding cavity. Accordingly, the label 80 may be thermally or materially fused with the cover 62 during the molding process. For example, the label 80 may be a plastic sheet, which is placed in the molding cavity prior to filling the cavity with a hot molding material. Upon filling the cavity with the hot molding material, the heat causes the label 80 to thermally fuse with the molding material eventually solidifying as the cover 62. As a result, the label 80 is integral with the cover 62 without any intermediate adhesives or glue. Molding the label 80 to the cover 62 in such a manner may reduce the likelihood of the label 80 wearing out or generally falling off of the cover 62 over time. Alternatively, the label 80 may be affixed with the cover 62 via an adhesive disposed between the top surface of the cover 62 and the label 80.

FIG. 6 is a perspective view of the front storage apparatus 12 having the cover 62 disposed in an open position relative to the storage base 44 in accordance with an exemplary embodiment of the present technique. As illustrated in FIG. 6, the latch 68 of the cover 62 is disposed along a central portion of a peripheral edge of the cover 62. The illustrated latch 68 has a generally v-shaped geometry, which may be flexible and resiliently compressible to facilitate latching with a mating portion 81 of the storage base 44. For example, the latch 68 may compress and bias a latch feature 83 against a mating feature 85 in the mating portion 81 of the storage base 44 when the cover 62 is closed onto the storage base 44 as illustrated in FIG. 5. In this manner, the latch 68 secures the cover 62 to the storage base 44, while the cover 62 is in a closed position. The cover 62 may be unlatched by pushing the latch inwardly to disengage the latch feature 83 from the mating feature 85. FIG. 6 further illustrates the manner by which inner compartments of the storage base 44 are fully exposed when the cover 62 is disposed in the open position.

Disposed on an inside surface of the drawer cover 62 is a label 82. The label 82 may include text 84 and illustrations 86 pertaining to consumable welding material and parts. The illustrations 86 may include, for example, graphical illustrations or exploded views of the welding gun 20 and its components. The items shown in the illustrations 86 may include consumable welding items, wear items, or exchangeable welding items to be stored in the front storage apparatus 12. Accordingly, the illustrations 86 may be accompanied by text 84, which may provide information for each part of the welding gun 20 depicted in the illustrations 86. For example, the text 84 may include part numbers, part names, reference numbers corresponding to the illustrations 86, and so forth. Thus, the text 84 and the figures 86 of the label 82 may serve the welder as a reference guide when locating, inspecting, replacing, exchanging, ordering, or generally looking for information about parts and consumables associated with the welding system 10 and the welding gun 20. Additional text and/or figures 88 may further be inscribed on the label 82 to include additional specifications relating to welding consumable materials and their use during in a welding operation. The label 82 may be affixed, adhered, or thermally fused to the inner surface of the cover 62 in a manner similar to that described above with reference to the label 80 of FIG. 5.

Again, the front storage apparatus 12 of the disclosed embodiments enables quick and easy access to various welding items without interference with other functional parts of the welding system 10, such as the power unit 15, the wire feeder 13, and so forth. The front storage apparatus 12 also provides a multi-stage securing system, which includes the closed position of the cover 62 over the storage base 44 (see FIG. 5) and also the folded position 44b of the front storage apparatus 12 relative to the chassis 11 (see FIG. 1). As a result, the front storage apparatus 12 can be self-contained independent from the chassis 11, and can be removed from the chassis 11. The front storage apparatus 12 also has a relatively small foot print or horizontal space consumption in both the folded and unfolded positions 44b and 44a largely due to the rotational mounting of the front storage apparatus 12 with the chassis 11. Thus, the rotational nature of the front storage apparatus 12 is particularly useful in crowded work areas.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a welding chassis; and
a storage structure comprising a storage receptacle, wherein the storage structure with the storage receptacle is rotatable outwardly from the welding chassis;
and a welding information label thermally fused with the storage structure.

2. The welding system of claim 1, wherein the storage structure with the storage receptacle rotates about a generally horizontal axis between a generally upright position and a generally horizontal position relative to the welding chassis.

3. The welding system of claim 1, wherein the storage structure with the storage receptacle rotates between a folded position and an unfolded position relative to a recess in the welding chassis.

4. The welding system of claim 1, wherein the storage structure is disposed at the front of the welding chassis.

5. The welding system of claim 1, wherein the storage structure comprises a removable cover coupled to a storage base to define a self enclosed storage volume comprising the storage receptacle, and the storage base and the removable cover are jointly rotatable relative to the welding chassis.

6. The welding system of claim 1, wherein the welding information label is disposed on a removable cover, or a storage base, or both of the storage structure.

7. The welding system of claim 1, wherein the welding information label includes welding consumable part numbers and graphical illustrations of parts in a welding gun.

8. The welding system of claim 1, wherein the storage structure comprises a removable mount and a carrying handle.

9. The welding system of claim 1, comprising a wire feed assembly, a gas delivery assembly, a welding gun, a welding power source, a gas cable, a power cable, a welding control, or a combination thereof.

10. The welding system of claim 1, wherein the storage structure comprises a storage tray having the storage receptacle and a cover, the storage tray is coupled to the welding chassis via a first rotational joint, and the cover is coupled to the storage tray via a second rotational joint independent from the first rotational joint.

11. The welding system of claim 10, wherein the storage tray and the cover are jointly rotatable about the first rotational joint relative to the welding chassis, and the cover is independently rotatable about the second rotational joint relative to the storage tray and the welding chassis.

12. The welding system of claim 11, wherein the storage tray comprises a storage volume defined by a left side portion, a right side portion, a rear side portion, a front side portion opposite the rear side portion, a bottom side portion, and an open top opposite the bottom side portion, wherein the cover is disposed over the open top, and the first and second rotational joints are both disposed at the rear side portion.

13. The welding system of claim 1, wherein the storage structure comprises a storage tray and a cover, the storage tray comprises a storage volume including the storage receptacle, the cover is disposed over the storage volume, and the cover is positioned between the storage tray and the welding chassis.

* * * * *